(12) United States Patent
Goto et al.

(10) Patent No.: US 7,605,501 B2
(45) Date of Patent: Oct. 20, 2009

(54) STEPPING MOTOR AND FAN HAVING THE SAME

(75) Inventors: Tatsuki Goto, Koriyama (JP); Takashi Kasahara, Koriyama (JP)

(73) Assignee: Nidec Copal Corporation, Tokyo (JP)

( * ) Notice: Subject to any disclaimer, the term of this patent is extended or adjusted under 35 U.S.C. 154(b) by 474 days.

(21) Appl. No.: 11/390,142

(22) Filed: Mar. 28, 2006

(65) Prior Publication Data

US 2006/0220475 A1 Oct. 5, 2006

(30) Foreign Application Priority Data

Mar. 29, 2005 (JP) .......................... P.2005-095529

(51) Int. Cl.
*H02K 37/00* (2006.01)
(52) U.S. Cl. ...................... 310/49 R; 310/254; 310/208
(58) Field of Classification Search ............... 310/67 R, 310/49 R, 254, 258, 259, 208
See application file for complete search history.

(56) References Cited

U.S. PATENT DOCUMENTS

| | | | | |
|---|---|---|---|---|
| 4,733,119 A | * | 3/1988 | Shiraki et al. ............... 310/268 |
| 5,233,252 A | * | 8/1993 | Denk ......................... 310/254 |
| 5,861,703 A | | 1/1999 | Losinski | |
| 6,608,411 B2 | * | 8/2003 | Horng et al. ............... 310/68 R |
| 6,809,439 B2 | * | 10/2004 | Iwase et al. ............... 310/49 R |
| 7,332,842 B2 | * | 2/2008 | Kasahara et al. ............... 310/84 |

FOREIGN PATENT DOCUMENTS

| | | |
|---|---|---|
| JP | 61-11390 | 2/1986 |
| JP | 2-100631 | 8/1990 |
| JP | 3-154613 | 7/1991 |
| JP | 5-153892 | 6/1993 |
| JP | 8-255859 | 10/1996 |
| JP | 10-5622 | 1/1998 |
| JP | 10-136634 | 5/1998 |
| JP | 11-197438 | 7/1999 |
| JP | 2000-513070 | 3/2000 |

* cited by examiner

*Primary Examiner*—Dang D Le
(74) *Attorney, Agent, or Firm*—McGinn IP Law Group, PLLC

(57) ABSTRACT

A stepping motor includes: a stator including a coil that is wound so as to form a hollow space; a rotor including a magnet to be disposed in the hollow space of the coil, the rotor being rotationally driven by changing magnetic poles of the stator;

and a magnetic member that is disposed adjacent to the coil so that a direction of a polarity of the magnet and a direction of a winding axis of the coil in a stable position of the magnet cross each other when the coil is excited or when not excited.

15 Claims, 6 Drawing Sheets

NOT-EXCITED STABLE POSITION
(ELECTRICITY APPLICATION IS OFF)

EXCITED
(ELECTRICITY APPLICATION IS ON)

NOT-EXCITED
(ELECTRICITY APPLICATION IS OFF)

EXCITED
(ELECTRICITY APPLICATION IS ON,
POLARITY IS INVERTED)

STEPPING MOTOR AND FAN HAVING THE SAME

BACKGROUND OF THE INVENTION

The present invention relates to a stepping motor which is used in a dehumidifier, an insect repellent device or the like in such a manner to be able to realize a current reduction, a noise reduction and an extended life, and a fan incorporating such stepping motor therein.

Conventionally, there has been proposed an electric fan for use in a dehumidifier or the like (for example, see the patent literature 1-3, and 8). However, these conventional technologies do not take it into consideration to drive an electric motor by a battery and thus do not aim at realization of the reduced current, reduced noise and extended life.

In view of the above problem, to reduce the power consumption of the fan motor, there are proposed a technology which detects the effect of the fan motor and controls (reduces) the number or revolutions of the fan motor in accordance with the amount of the detected effect or drives the fan motor intermittently to thereby restrict the current consumption (for example, see the patent literature 4), a technology in which a fan motor is composed of a single blade using a piezoelectric element (for example, see the patent literature 5), and the like.

However, in the technology in which the fan motor is made of a single blade, there is necessary a booster circuit, which results in the expensive fan motor.

As a motor of a low current consumption type, there are known single-phase stepping motors for a clock (for example, see the patent literature 6 and 9). However, these stepping motors are very small in torque and thus it is difficult to apply them to a fan motor.

Further, in the patent literature 7, there is proposed a fan motor which uses a stepping motor as a drive source. However, in this fan motor, since the inertia moment of an impeller is large when the fan motor is driven with a low current, the fan motor cannot be started but is caused to step out. Therefore, it is difficult to drive the fan motor with a low current.

In addition, in the above patent literature 2 and 3, there are disclosed structures in which there is provided a fan receiving part in a motor shaft and a fan is driven by friction between the fan receiving part and fan. Use of such structure intends to stop the fan even during rotation of a motor when the fan device is inclined. In other words, the motor shaft and fan have a clearance between them in the radial direction; and, therefore, there is a possibility that the center of gravity of the fan can be deviated from the motor shaft, which can worsen the balance of the fan or can give rise to vibrations and noises.

In view of the above circumstances, conventionally, as a fan motor, there is used a DC motor with a brush in which the resistance value of a rotor is set large, whereby there is obtained a no-load current of several mA. However, since the DC motor is driven continuously for a long time, the life of the DC motor provides a problem. To solve this problem, it is also possible to use a brushless motor having no contact such as a brush, thereby being able to extend the life of the motor. However, in the brushless motor, only the Hall element thereof requires a current of several mA and thus, when electricity necessary for conduction of other drive circuits and motor is included, the necessary consumption current provides several decades of mA. As a result, for example, it is difficult to drive the brushless motor continuously for a long time using a battery.

There is known a sensor-less motor which includes no Hall element. In this motor, however, it is necessary to detect a coil back electromotive current and thus the motor must be high in the starting characteristic thereof. As a result, it is difficult to reduce the power consumption, so that the motor becomes expensive. When there is used a stepping motor requiring no Hall element, it is also possible to drive it with a reduced current. But, in this case, since the start torque of the motor is small, when driving and rotating an impeller and the like having large moment of inertia, the motor cannot be started but can be stepped out. That is, with use of such motor, it is difficult to drive the impeller with a low current.

Patent literature 1: JP-UM-H02-100631 publication
Patent literature 2: JP-H03-154613 publication
Patent literature 3: JP-H11-197438 publication
Patent literature 4: JP-H10-5622 publication
Patent literature 5: JP-2000-513070 publication
Patent literature 6: JP-S61-11390 publication
Patent literature 7: JP-H10-136634 publication
Patent literature 8: JP-H5-153892 publication
Patent literature 9: JP-H8-255859 publication

SUMMARY OF THE INVENTION

The invention is made to solve the above problems found in the prior art. Thus, it is an object of the invention to provide a stepping motor which can drive and rotate an impeller with a reduced current, a reduced noise and an extended life, and a fan incorporating such stepping motor therein. In order to solve the aforesaid object, the invention is characterized by having the following arrangement.

(1) A stepping motor comprising:
  a stator including a coil that is wound so as to form a hollow space;
  a rotor including a magnet to be disposed in the hollow space of the coil, wherein the rotor is rotationally driven by changing magnetic poles of the stator; and
  a magnetic member that is disposed adjacent to the coil so that a direction of a polarity of the magnet and a direction of a winding axis of the coil in a stable position of the magnet cross each other when the coil is excited or when not excited.

(2) The stepping motor according to (1), wherein the magnetic member is formed in a cylindrical shape and is disposed in an area defined by the coil winding axis and a line crossing at a right angle with the winding axis of the coil and a rotation shaft of the rotor, the area excluding areas existing on the winding axis and the crossing line.

(3) The stepping motor according to (1), wherein the stator includes two coil bobbins identical in shape with each other and connected together along a direction of the winding axis of the coil.

(4) The stepping motor according to (1), further comprising a drive circuit including a CMOS transistor for controlling an application of electricity to the coil.

(5) The stepping motor as set forth in (4), wherein the drive circuit is equivalent to an IC for a clock.

(6) The stepping motor according to (4), wherein the drive circuit is structured so that a pulse frequency thereof to be output at a start time of the motor is set lower than that to be output in a steady time of the motor.

(7) A fan comprising:
  a stepping motor according to claim 1;
  an impeller disposed on one side of a rotation shaft of the rotor; and
  a connecting device for connecting the impeller to the rotor rotation shaft so as to be rotatable with respect to the rotor rotation shaft,
  wherein the connecting device allows, at the time of starting driving the motor, the rotor rotation shaft to rotate idly with respect to the impeller to thereby absorb the inertial force of the impeller and allows, as the number of rotations of the rotor rotation shaft increases, the impeller to rotate following the rotor rotation shaft.

(8) The fan according to (7), wherein the connecting device is a coil spring to one end of which the impeller is connected and to the other end of which the rotor rotation shaft is fixed, the coil spring being wound around the rotor rotation shaft.

(9) The fan according to (7), wherein the connecting device includes a first connecting part connected to the impeller side and a second connecting part connected to the rotor rotation shaft side, and a ball which is disposed in the space defined by the first and second connecting parts, and can be moved due to a centrifugal force generated when the rotor is rotated.

As has been described above, according to the invention, the impeller can be driven and rotated with a small current, a low noise and an extended life.

DETAILED DESCRIPTION OF PREFERRED EMBODIMENTS

Now, description will be given below of a preferred embodiment of the invention with reference to the accompanying drawings.

By the way, the embodiment to be described below is an example for realizing the invention and thus the invention can also apply to the changes or modifications of the below-mentioned embodiment without departing from the scope of the spirit of the invention.

Figure 1:
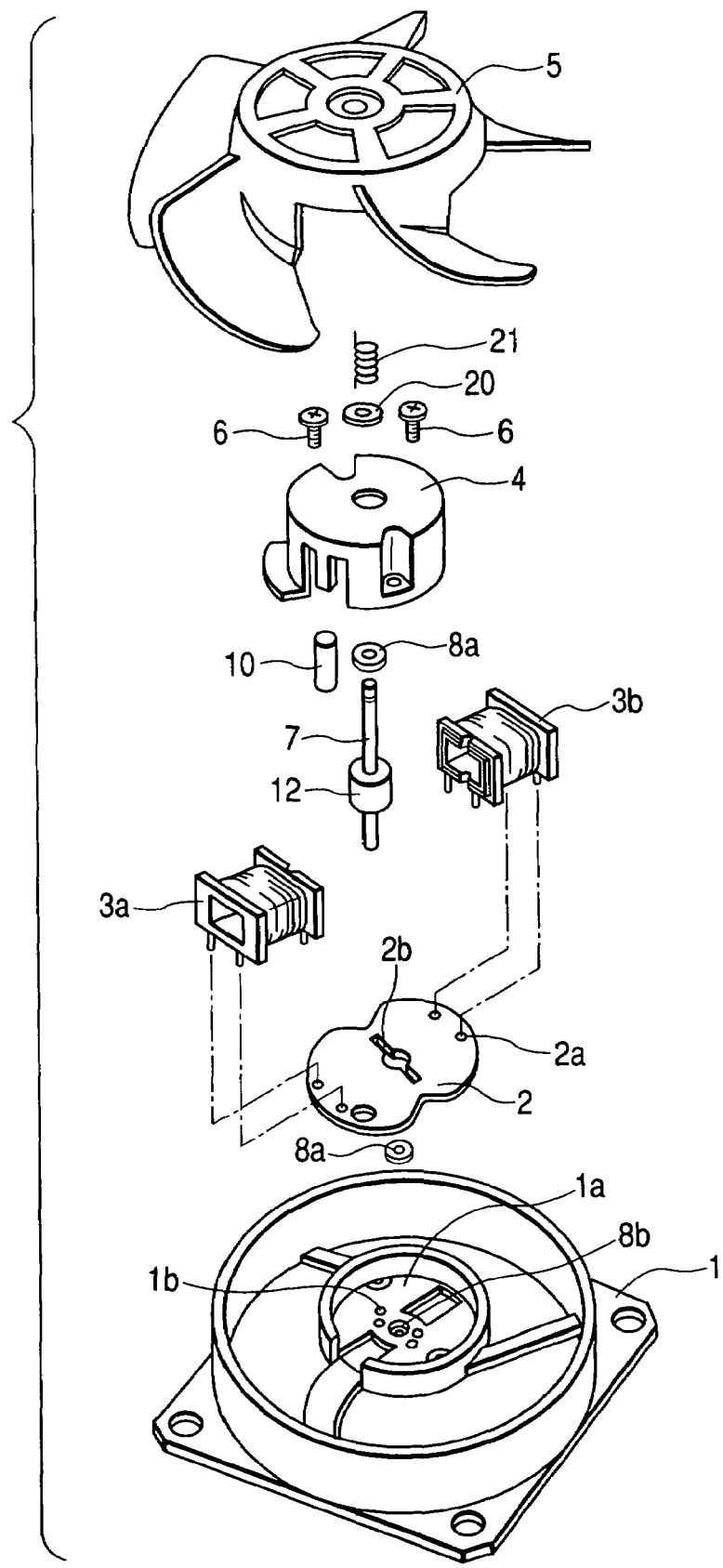
FIG. 1 is an exploded perspective view of a stepping motor and a fan device according to an embodiment of the invention.
Figure 2:
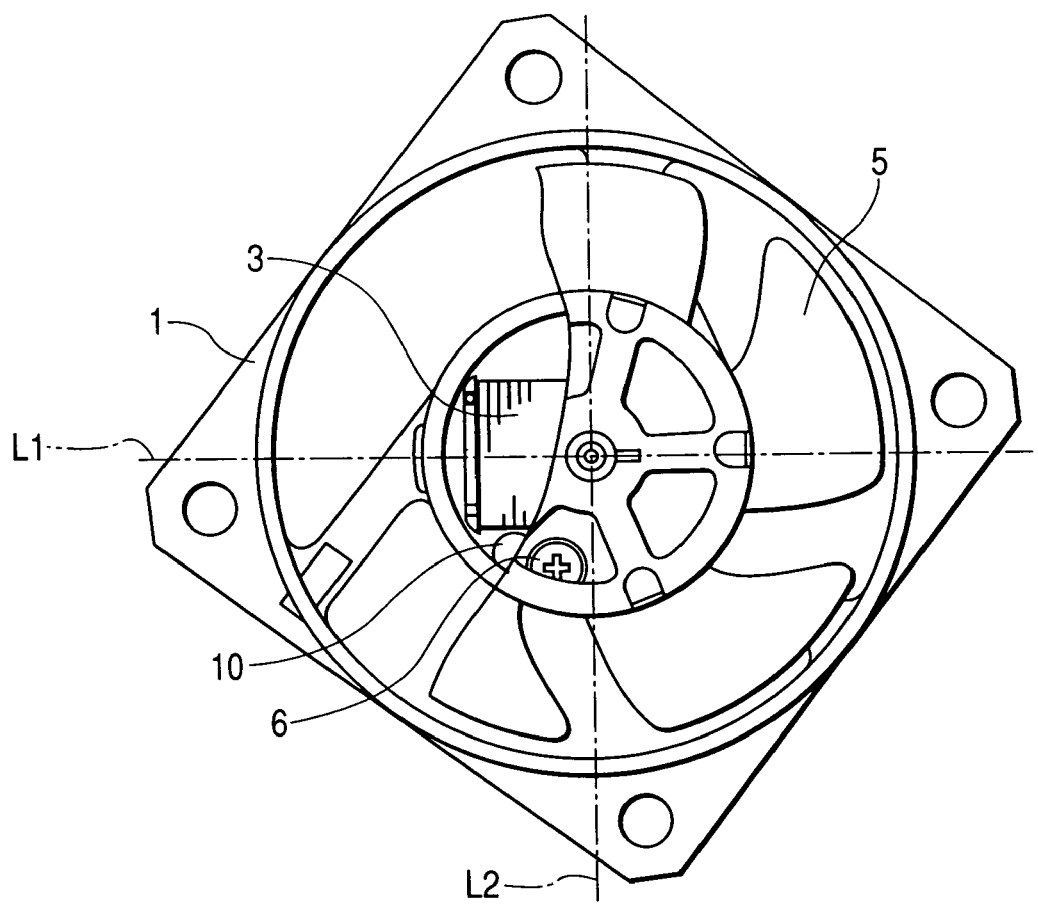
FIG. 2 is a side section view of a fan device shown in FIG. 1, showing the assembled state thereof.
Figure 3:
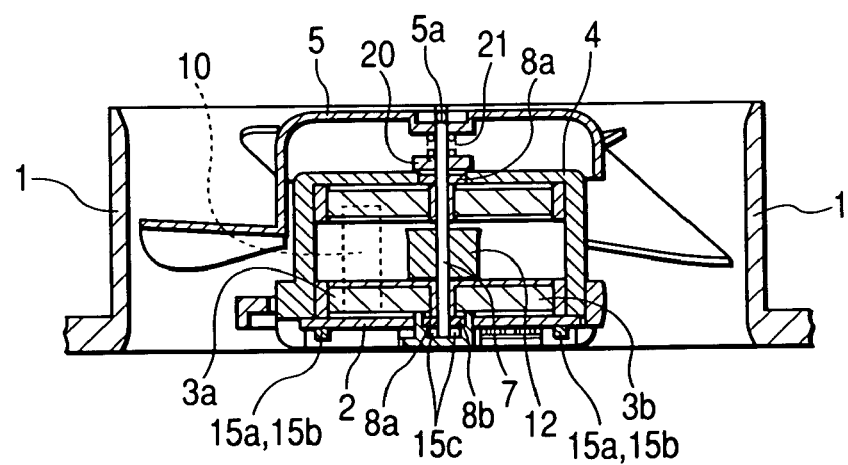
FIG. 3 is a partially broken plan view of the fan device shown in FIG. 1.
Figure 4A:
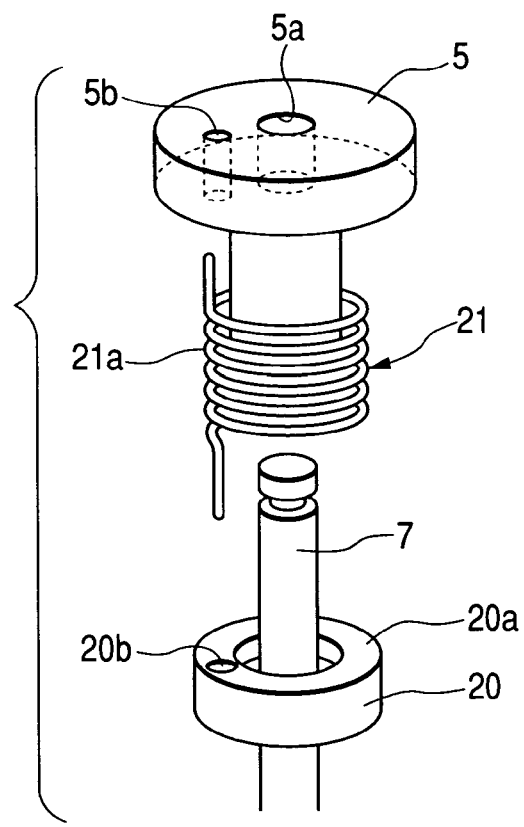
FIG. 4A is a perspective view of a connecting structure for connecting together an impeller and an output shaft.

FIG. 1 is an exploded perspective view of a stepping motor and a fan device according to the embodiment of the invention, FIG. 2 is a side section view of the fan device shown in FIG. 1, showing a state in which the fan device is assembled, FIG. 3 is a partially broken plan view of the fan device shown in FIG. 1, and FIG. 4A is a perspective view of a connecting structure for connecting together an impeller and an output shaft.

As shown in FIGS. 1 to 3, in the fan device according to the present embodiment, an impeller 5 including two or more blade parts such as an axial fan and a sirocco fan is connected to the output shaft 7 of a single-phase PM-type stepping motor.

In the single-phase PM-type stepping motor, a set of cylindrical-shaped rotor magnets (permanent magnets) 12 magnetized on the S and N poles thereof are fixed to the output shaft 7 to thereby constitute a rotor (a rotary part). The output shaft 7 is rotatably supported by a pair of radial bearings 8a which are combined with the output shaft 7 in the axial direction thereof. One of the bearings 8a is pressure inserted into and is thereby fixed to a bottomed cylindrical-shaped (cup-shaped) cover 4 forming the outer shape of the motor, while the other is pressure inserted and is thereby fixed to the central portion of the bottom plate 1a of a housing 1 forming the outer shape of the fan device, whereby the bearings 8a support the two end portions of the output shaft 7 in the radial direction thereof. A thrust bearing 8b supports the lower end portion of the output shaft 7 in the thrust direction thereof through a hole formed in the central portion of the bottom plate 1a of the housing 1.

On the other hand, a stator (a fixed part) includes a pair of hollow coil bobbins 3 on each of which a coil such as an enamel copper line is wound about 2000 times. The coil bobbins 3a, 3b are connected together along the coil winding axis direction (or the coil bobbin longitudinal direction) L1 and, on the connecting part thereof, there is supported the output shaft 7 of the rotor magnet 12. The rotor magnet 12 is disposed in a hollow space in the above-mentioned connecting part. That is, the rotor magnet 12 is disposed such that the output shaft 7 thereof is perpendicular to the winding axis direction L1 of the coil.

The coil bobbins 3a, 3b respectively include a pair of terminals 15a, 15b which are made of resin or the like integrally with the coil bobbins 3a, 3b for connecting together the start and terminal ends of the coil electrically. The terminals 15a, 15b are inserted into a printed plug board disposed on the bottom plate 1a of the housing 1 or a land hole 2a formed in a circuit board 2 and are then electrically connected thereto by soldering or the like. When electricity is applied to the coil, the respective coil bobbins 3a, 3b are magnetically energized to thereby provide magnetic poles, so that they generate a Lorenz force between the rotor magnet 12 and themselves. The coils wound around the coil bobbins 3a, 3b are wound in the mutually opposite directions around the winding axis direction L1 and, when electricity is applied, in the respective coil bobbins 3a, 3b, there are generated different magnetic poles.

In the respective coil bobbins 3a, 3b, there are provided projection portions 15c formed integrally with the coil bobbins 3a, 3b. When the projection portions 15c are engaged into a hole portion 2b formed in the circuit board 2 and a hole portion 1b formed in the bottom plate 1a of the housing 1, the circuit board 2 can be positioned properly while it is held by and between the projections 15c of the coil bobbins 3a, 3b and the bottom plate 1a of the housing 1. By the way, these projection portions 15c may be preferably disposed in portions which are distant from the output shaft 7, large in thickness and high in strength.

Here, the number of coil bobbins 3a, 3b is not limited to one pair (two), but three or more coil bobbins may be connected in series in the winding axis direction L1, or four coil bobbins may be connected crosswise.

On the circuit board 2, there is mounted a drive circuit (which will be discussed later), whereby there can be generated pulse voltage wave forms to be applied to the coil.

In the neighborhood of any one of the coil bobbins 3a, 3b, there is disposed a cylindrical-shaped cogging pin 10 made of magnetic material (stainless steel (SUS 420), iron, ferrite or the like) in order that, in the stable position of the magnet 12 when the coil is excited (energized electrically) or when it is not excited (not energized electrically), the polarity direction (see L3 shown in FIGS. 7A to 7D) of the magnet 12 can cross the coil winding axis direction L1 and then shift from this direction L1. The cogging pin 10 is fixed to the inside of the cover 4 by pressure insertion or the like and is disposed adjacent to the coil bobbins 3a, 3b. The reason for this is as follows: that is, since the rotor magnet 12 is magnetized on the two poles thereof while the coil bobbins 3a, 3b are magnetized in two phases, the stable positions of the coil bobbins 3a, 3b are shifted from each other by the cogging pin 10 to thereby apply rotation torque to the rotor magnet 12 and specify the rotation direction thereof in one direction.

The cogging pin 10 may be preferably disposed in a fan-shaped area (however, areas existing on the L1 and L2 are excluded) which exists in the neighborhood of the coil bobbins 3a, 3b within the cover 4 and is defined by the coil winding axis direction L1 and a line L2 intersecting at right angles not only with the winding axis direction L1 but also with the output shaft 7.

When the cogging pin 10 is stabilized at a position where the magnetic poles of the rotor magnet 12 are shifted from the magnetic poles of the coil bobbins 3a, 3b and is disposed at a position where a given level of rotation torque can be obtained in the motor start time, a current necessary in the motor start time can be reduced.

The shape of the cogging pin 10 depends on the excitation intensity of the coil bobbins 3a, 3b and the magnetic force of the rotor magnet 12. Therefore, the shape of the cogging pin 10 is not limited to the cylindrical shape but, for example, the cogging pin 10 may be formed in a disk-like shape and thus may be disposed above or below the coil bobbins 3a, 3b or in the lower portion of the impeller 5, or it may be formed in a square shape or in a hollow shape.

The cover 4 stores therein the stator composed of the coil bobbins 3a, 3b and the like and the rotor composed of the rotor magnet 12 and the like, and is fastened and fixed to the bottom plate 1a of the housing 1 by screws 6 or the like.

The coil bobbins 3a, 3b, when electricity is applied to their respective coils, are excited to provide magnetic poles; and, by inverting the polarities of these magnetic poles, the rotor magnet 12 can be rotated. And, the cogging pin 10 can be used to set up a position relationship where the direction of the magnetic flux of the coil bobbins 3a, 3b when they are excited (the winding axis direction L1 of the coils) and the polarity direction of the rotor magnet 12 are prevented from being on the same straight line or from being parallel to each other, but the two directions cross each other; and, the cogging pin 10 can form the respective stable positions of the rotor magnet 12 when the coil is excited and when the coil is not excited, whereby the rotor magnet 12 is able to start its rotation under its own power (see FIGS. 7A to 7D).

Figure 7A:
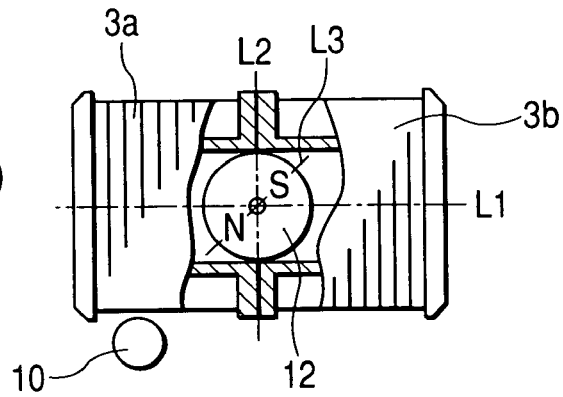
FIGS. 7A to 7D are explanatory views of the rotation operation of a stepping motor according to the embodiment of the invention.
Figure 7B:
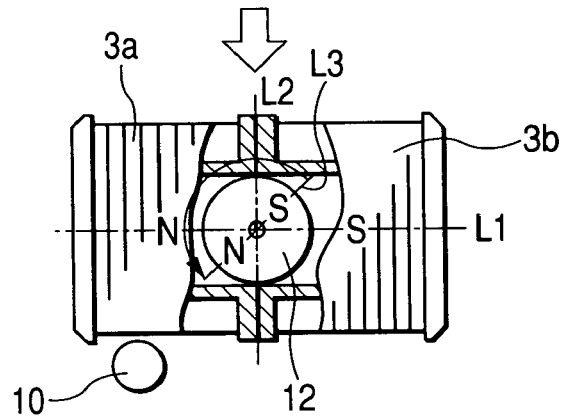
Figure 7C:
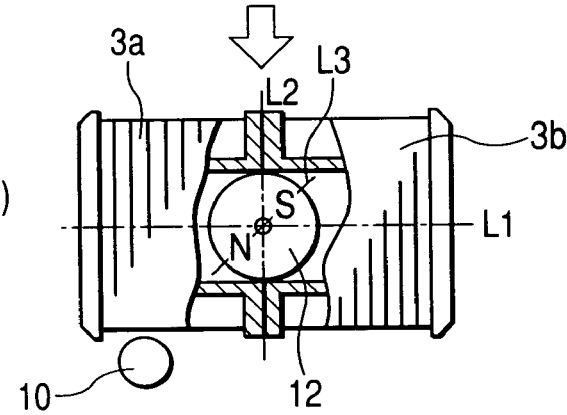

In other words, in the not-excited stable position of the rotor magnet 12, there is provided a position relationship in which the polarity of the rotor magnet 12 receives cogging torque from the cogging pin 10, whereby the direction L1 (see FIGS. 7A to 7D) of the magnetic flux generated between the coil bobbins 3a, 3b when they are excited and the polarity direction L3 of the rotor magnet 12 cross each other and then shift from each other (that is, they are prevented from being parallel to each other) (see FIGS. 7A and 7C).

Figure 7D:
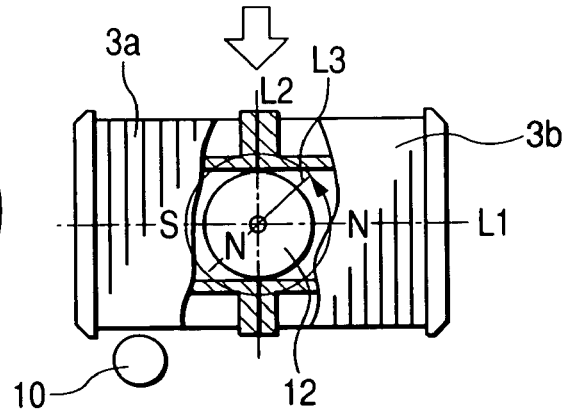

In the excited stable position of the rotor magnet 12, there is provided a position relationship in which the polarities of the rotor magnet 12 receive an attracting force and a repelling force from the coil bobbins 3a, 3b to thereby allow the rotor magnet 12 balance well, and the polarities of the rotor magnet 12 are rotated 180° from the not-excited stable position (see FIGS. 7B and 7D).

As shown in FIG. 4A, the output shaft 7 is slidably (idly rotatably) inserted into an axial hole 5a formed on the center axis of rotation of the impeller 5, while the impeller 5 is connected to the output shaft 7 by a connecting device in such a manner that it can be rotated with respect to the output shaft 7.

The above-mentioned connecting device is a coil spring 21 wound around the output shaft 7. One end of the coil spring 21 is connected to a mounting hole 5b formed in the neighborhood of the axial hole 5a of the impeller 5, while the other end is fixed to a mounting hole 20b formed in a holder 20 which is mounted on the output shaft 7 by pressure insertion or the like. The coil part 21a of the coil spring 21 is held by and between the impeller 5 and a stepped part 20a formed in the holder 20.

The coil spring 21 is structured such that, in order to make its spring constant small, the line diameter thereof is made fine and thus the torsion torque thereof is set weak. When starting the motor, while idly rotating the output shaft 7 with respect to the impeller 5, the coil spring 21 absorbs the inertial force (moment) of the impeller 5 to thereby reduce the moment of inertia in the motor start time applied to the output shaft 7. After then, as the number of rotations of the output shaft 7 increases, the force absorbed by the coil spring 21 is released to thereby rotate the impeller 5 with respect to the output shaft 7 in such a manner that the impeller 5 follows the output shaft 7.

According to the above-mentioned connecting device, even when the moment of inertia of the impeller is large and thus a motor is difficult to start, or even when the impeller has such large moment of inertia as steps out the motor when starting the motor, as in a conventional structure in which an impeller is fixedly connected to an output shaft, the impeller having such large moment of inertia can be driven and rotated using a stepping motor having small start torque. Therefore, the motor can be started without stepping out and the motor can be driven with a small current, a low noise and an extended life.

Figure 4B:
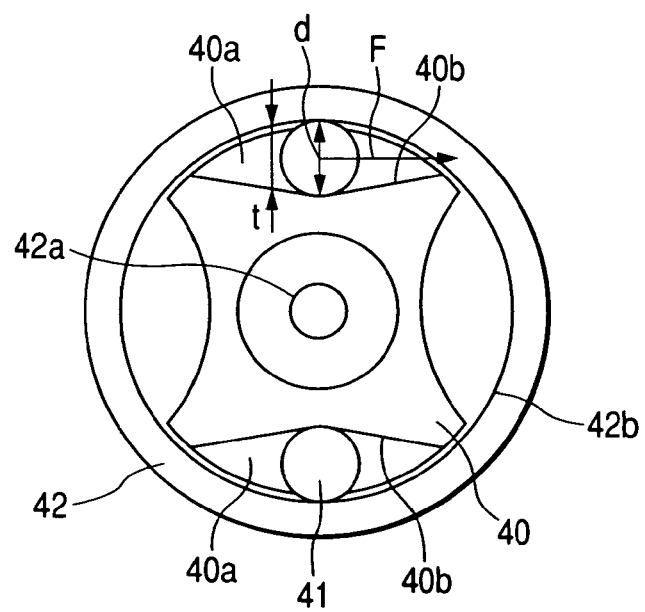
FIG. 4B is a sectional view of another example of the connecting structure.

By the way, instead of the coil spring 21, there may be used a ball 41 shown in FIG. 4B.

A connecting device shown in FIG. 4B includes a holder 40 as a connecting part on the output shaft 7 side thereof. The holder 40 is mounted on the output shaft 7 by pressure insertion or the like and includes fan-shaped notches 40a formed at least in one portion (in FIG. 4B, two portions symmetrical with respect to the center axis) of the outer peripheral portion thereof. The connecting device includes, as a connecting part on the impeller 5 side thereof, a concentrically formed cylindrical surface 42b formed around the center of rotation of the impeller 5. In a fan-shaped space existing between the notch 40a and cylindrical surface 42b, there is disposed the fan-shaped ball 41. Here, a clearance t between the side wall portion 40b of the notch 40a and cylindrical surface 42b is substantially identical with the diameter d of the ball 41 in the widest portion in the center of the fan-shaped space (a position where the center axis of the impeller 5 and the center of the ball 41 are on the same straight line); and, the clearance t becomes narrower as it approaches the peripheral side of the fan-shaped space in a direction where a centrifugal force F is applied.

And, in the start time of the motor, the ball 41 is loosely fitted into the fan-shaped space and the output shaft 7 is idly rotated with respect to the impeller 5; as the number of rotations of the output shaft 7 increases, the centrifugal force F is applied to the ball 41 to thereby move the ball 41 within the fan-shaped space from the center thereof to the peripheral side thereof; and, the ball 41 is then moved into a space between the cylindrical surface 42b of the impeller 5 and the side wall portion 40b of the notch 40a due to the wedge effect to thereby engage the impeller 5 and holder 40 with each other. Due to such operation, the holder 40 and impeller 5 are connected together through the ball 41 and are thus rotated following the output shaft 7.

Figure 5:
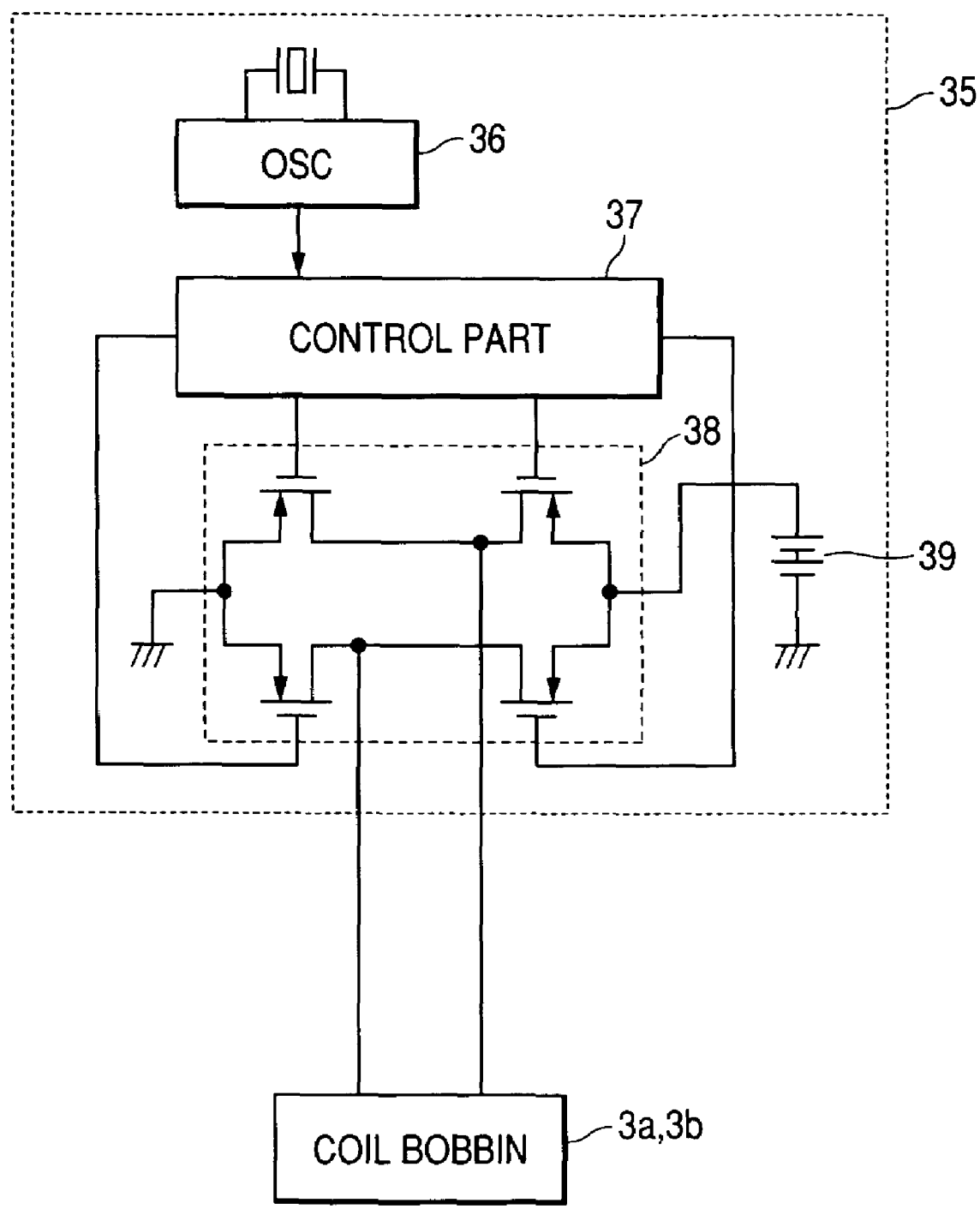
FIG. 5 is a block diagram of a drive circuit according an embodiment of the invention.
Figure 6A:
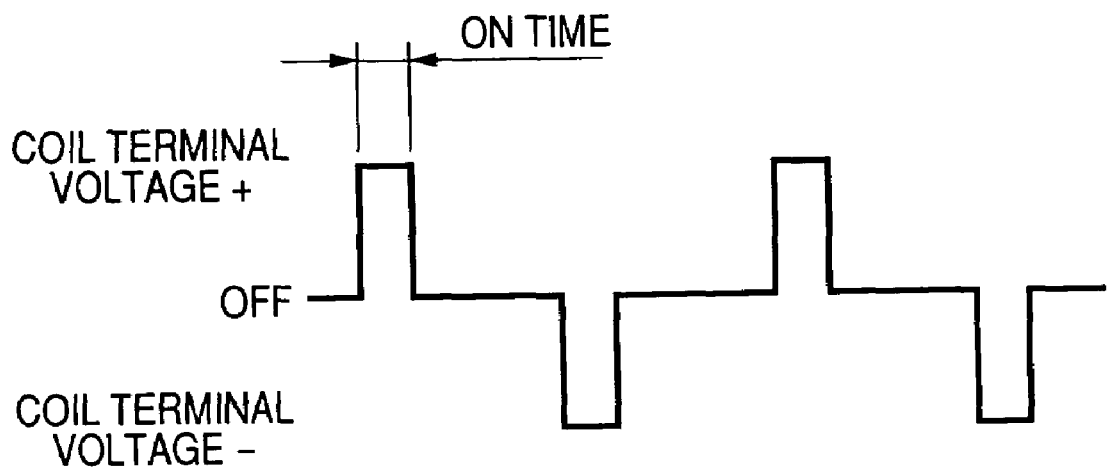
FIGS. 6A and 6B wave form charts of the wave forms of drive voltages generated by the drive circuit shown in FIG. 5 and applied to a stepping motor.
Figure 6B:
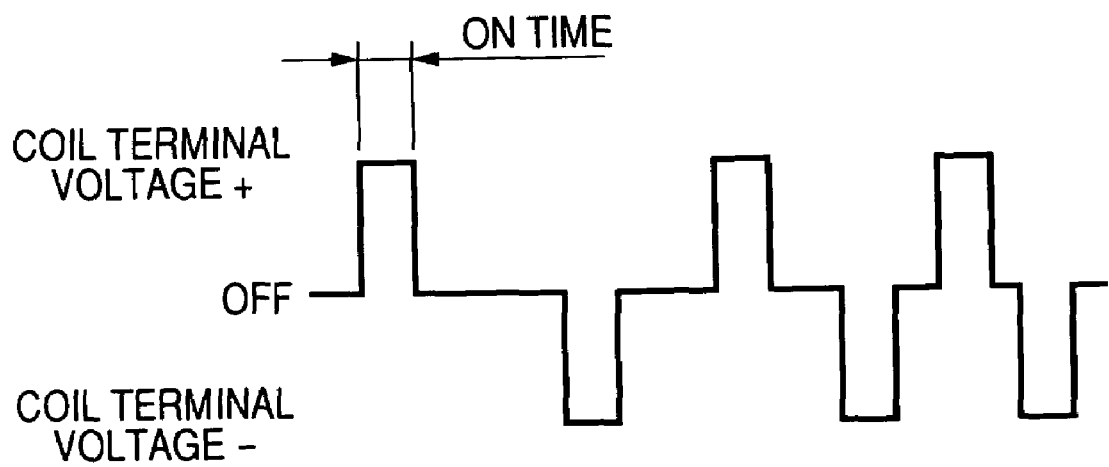

Now, FIG. 5 is a block diagram of a drive circuit according to an embodiment of the invention, and FIGS. 6A and 6B are wave form charts of the wave forms of drive voltages generated by the drive circuit shown in FIG. 5 and applied to a stepping motor.

As shown in FIG. 5, a drive circuit 35 uses, for example, two dry element batteries 39 as its power supply. In the drive circuit 35, a clock signal output from an oscillation circuit 36 incorporating therein a quartz oscillator and the like is frequency divided and wave shaped by a control part 37, drive control signals are output to the respective gates of a CMOS-FET 38 composed of four CMOS transistors, and such drive voltages having an alternating pulse wave form and inverting periodically as shown in FIGS. 6A and 6B are applied across the terminals of the coils, thereby driving and rotating a single-phase stepping motor at a constant speed. By the way, in the present embodiment, the ON time of the drive voltage is, for example, of the order of 24 ms, while the number of rotations of the stepping motor is of the order of 700 rpm.

Although FIG. 6A shows an example in which the pulse frequency is set constant from the start time of the motor, as shown in FIG. 6B, when the pulse frequency in the motor start time is set lower than in the steady time (slow-up voltage wave form), there can be added a slow-up function which increases the number of rotations of the motor gradually from the start time to the steady time, thereby being able to further facilitate the operation of the above-mentioned connecting device which drives and rotates the impeller having large moment of inertia with a small current.

The coil resistance of a single-phase stepping motor according to the present embodiment is several hundreds of ohms and is thus considerably larger than in an ordinary stepping motor; and, sometimes, a resistor having a resistance of several hundreds of ohms is connected in series to the stepping motor and, in this case, the drive current provides several mA.

Since a general purpose IC for a clock can be used as the above-mentioned drive circuit 35, the stepping motor according to the present embodiment can be produced at a low cost, the consumption current thereof is small, and the present stepping motor can be driven for a long time using a dry element battery similarly to a clock (for example, two dry element batteries provide 3 V, the consumption current is 2 mA, and the capacity of the battery is 2000 mA; and, therefore, the present stepping motor can be driven continuously for 40 days).

Now, FIG. 7A to 7D are explanatory views of the rotation operation of a stepping motor according to the present embodiment, showing the position relationship between the coil bobbins 3a, 3b and rotor magnet 12.

In the not-excited stable position (application of electricity is OFF) of the rotor magnet 12 shown in FIG. 7A, there is provided a position relationship in which the magnetic pole of the rotor magnet 12 receives the cogging torque from the cogging pin 10, whereby the direction L1 of the magnetic flux generated between the coil bobbins 3a, 3b and the polarity direction L3 of the rotor magnet 12 cross each other and then shift from each other.

In the above-mentioned not-excited stable position, when electricity is applied to the coil (ON) to thereby excite the coil bobbins 3a, 3b, the magnetic pole of the rotor magnet 12 different in magnetic polarity from the coil bobbins 3a, 3b is attracted and, at the same time, the magnetic pole of the rotor magnet 12 identical in magnetic polarity repels the coil bobbins 3a, 3b so that the rotor magnet 12 balances well. As a result, the rotor magnet 12 is rotated from the not-excited stable position shown in FIG. 7A to the electromagnetically stable position shown in FIG. 7B in which the polarity of the rotor magnet 12 has been rotated 180° counterclockwise.

After then, even if the electricity application to the coil is stopped (OFF), the rotor magnet 12 maintains the not-excited stable position (FIG. 7C) in which the polarity of the rotor magnet 12 has been inversely rotated 180° with respect to FIG. 7A.

Next, in the not-excited stable position shown in FIG. 7C, when a pulse inverted from the pulse generated in the electricity applied state shown in FIG. 7B is output to thereby allow the coil bobbins 3a, 3b to provide a polarity inverted from the polarity in the excited state shown in FIG. 7B, the magnetic pole of the rotor magnet 12 different in polarity from the coil bobbins 3a, 3b is attracted by these coil bobbins and, at the same time, the magnetic pole of the rotor magnet 12 identical in polarity with the coil bobbins 3a, 3b repels the coil bobbins, so that the rotor magnet 12 balances well. In other words, the rotor magnet 12 is rotated from the not-excited stable position shown in FIG. 7C up to the electromagnetically stable position shown in FIG. 7D where the polarity of the rotor magnet 12 has been rotated 180° counterclockwise, that is, the rotor magnet 12 returns to the position shown in FIG. 7A, thereby completing one rotation. From that time on, similar electrical application patterns are carried out repeatedly to thereby rotate the rotor magnet 12 continuously.

By the way, as a modification of the above-mentioned embodiment, there may also be employed a structure in which a solar battery is carried on the outer surface of the housing 1 and the above-mentioned drive circuit 35 is driven using the solar battery (which may be used together with the dry element battery 39) as a power supply. Since the stepping motor according to the present embodiment can be driven with a small current, if, for example, a solar battery having a size of 50×20 mm is used, the dry element battery is not necessary when the stepping motor is used in the daytime.

The present invention can be applied as a driving motor to an air cleaner, an aromatic spray, a dehumidifier, an insect repellent device and the like incorporating therein an electric motor for convection of the air.

In the above-mentioned embodiment, description has been given of an example applied to a single-phase PM-type stepping motor. However, the invention is not limited to this but it can also be applied to an PM-type stepping motor of two or more phases, a VR-type (Variable Reluctance Type) stepping motor in which a rotor is made of a cogwheel-shaped iron core, and an HB-type (Hybrid Type) stepping motor in which a rotor is made of a cogwheel-shaped iron core and a magnet.

What is claimed is:

1. A stepping motor comprising:
    a stator comprising at least two coils having winding axes that coincide with each other, said at least two coils being wound such that a hollow space is formed;
    a rotor comprising a magnet to be disposed in the hollow space of the coils, said magnet consisting of two poles, the rotor being rotationally driven by changing magnetic poles of the stator; and
    a magnetic member that is disposed adjacent to the coils such that, in a stable position of the magnet, when the coils are one of excited and not excited, the winding axes of the coils cross a direction of a polarity of the magnet.

2. The stepping motor according to claim 1, wherein the magnetic member is formed in a cylindrical shape and is disposed in an area defined by the winding axes of the coils and a line crossing at a right angle with the winding axes of the coils and a rotation shaft of the rotor, the area excluding areas existing on the winding axes and the line crossing at the right angle.

3. The stepping motor according to claim 1, wherein the stator comprises two coil bobbins identical in shape and connected together along a direction of the winding axes of the coils.

4. The stepping motor according to claim 3, wherein the magnetic member comprises a cogging pin that is disposed adjacent to the coil bobbins and fixed to an inside of a cover.

5. The stepping motor according to claim 4, wherein a shape of the cogging pin depends on an excitation intensity of the coil bobbins and a magnetic force of the magnet.

6. The stepping motor according to claim 1, further comprising:
a drive circuit comprising a CMOS transistor for controlling an application of electricity to the coils.

7. The stepping motor according to claim 6, wherein the drive circuit is equivalent to an integrated circuit (IC) for a clock.

8. The stepping motor according to claim 6, wherein the drive circuit is structured such that a pulse frequency of the drive circuit to be output at a start time of the motor is set lower than a pulse frequency to be output in a steady time of the motor.

9. A fan comprising:
a stepping motor according to claim 1;
an impeller disposed on one side of a rotation shaft of the rotor; and
a connecting device for connecting the impeller to the rotor rotation shaft such that the impeller is rotatable with respect to the rotation shaft of the rotor,
wherein the connecting device allows, at the time of starting a driving of the motor, the rotation shaft of the rotor to rotate idly with respect to the impeller to thereby absorb an inertial force of the impeller and allows, as a number of rotations of the rotation shaft of the rotor increases, the impeller to rotate following the rotation shaft of the rotor.

10. The fan according to claim 9, wherein the connecting device comprises a coil spring to an end of which the impeller is connected and to another end of which the rotation shaft of the rotor is fixed, the coil spring being wound around the rotation shaft of the rotor.

11. The stepping motor according to claim 1, wherein the direction of the winding axes of the coil is inclined with respect to the direction of the polarity of the magnet.

12. The stepping motor according to claim 1, wherein the magnetic member comprises a cogging pin that is fixed to an inside of a cover.

13. The stepping motor according to claim 12, wherein a direction of the winding axes of the coils and the direction of the polarity of the magnet are dependent on the cogging pin.

14. The stepping motor according to claim 12, wherein the cogging pin provides torque to the polarity of the magnet.

15. A fan comprising:
a stepping motor, comprising:
a stator comprising a coil that is wound such that a hollow space is formed;
a rotor comprising a magnet to be disposed in the hollow space of the coil, the rotor being rotationally driven by changing magnetic poles of the stator; and
a magnetic member that is disposed adjacent to the coil such that, in a stable position of the magnet, when the coil is one of excited and not excited, a direction of a winding axis of the coil crosses a direction of a polarity of the magnet;
an impeller disposed on one side of a rotation shaft of the rotor; and
a connecting device for connecting the impeller to the rotation shaft of the rotor such that the impeller is rotatable with respect to the rotation shaft of the rotor,
wherein the connecting device allows, at the time of starting a driving of the motor, the rotation shaft of the rotor to rotate idly with respect to the impeller to thereby absorb an inertial force of the impeller and allows, as a number of rotations of the rotation shaft of the rotor increases, the impeller to rotate following the rotation shaft of the rotor, and
wherein the connecting device comprises:
a first connecting part connected to a side of the impeller; and
a second connecting part connected to a side of the rotation shaft of the rotor; and
a ball which is disposed in a space defined by the first and second connecting parts and is moveable due to a centrifugal force generated when the rotor is rotated.

* * * * *